United States Patent
Jones et al.

(10) Patent No.: US 9,008,871 B2
(45) Date of Patent: Apr. 14, 2015

(54) AIRCRAFT LANDING GEAR MONITORING APPARATUS

(75) Inventors: Ian James Jones, Bristol (GB); Bastiaan Van-Griensven, Bristol (GB); David J E Light, Bristol (GB); Roger John Hazelden, Staffordshire (GB); David Matthew James Stark, West Midlands (GB); Martin John Thompson, West Midlands (GB)

(73) Assignee: Airbus Operations Limited, Bristol (GB)

( * ) Notice: Subject to any disclaimer, the term of this patent is extended or adjusted under 35 U.S.C. 154(b) by 780 days.

(21) Appl. No.: 12/530,675

(22) PCT Filed: Mar. 5, 2008

(86) PCT No.: PCT/GB2008/050154
§ 371 (c)(1),
(2), (4) Date: Sep. 10, 2009

(87) PCT Pub. No.: WO2008/110836
PCT Pub. Date: Sep. 18, 2008

(65) Prior Publication Data
US 2010/0121504 A1 May 13, 2010

(30) Foreign Application Priority Data

Mar. 14, 2007 (GB) .................................. 0704878.8

(51) Int. Cl.
*B64D 45/00* (2006.01)
*G01D 21/00* (2006.01)
(Continued)

(52) U.S. Cl.
CPC ................ *B64D 45/00* (2013.01); *G01D 21/00* (2013.01); *G01L 5/0052* (2013.01); *G07C 5/008* (2013.01); *G07C 5/085* (2013.01); *B64D 2045/008* (2013.01); *Y02T 50/53* (2013.01)

(58) Field of Classification Search
USPC ...... 701/16, 124; 244/102 A, 102 R; 73/1.15, 73/781, 862.382
See application file for complete search history.

(56) References Cited

U.S. PATENT DOCUMENTS 3,712,122 A * 1/1973 Harris et al. .................. 340/945
4,278,219 A * 7/1981 Finance .................... 244/100 R
(Continued)

FOREIGN PATENT DOCUMENTS

CA 2587750 5/2006
EP 1499864 A1 1/2005
(Continued)

OTHER PUBLICATIONS

ISR for PCT/GB2008/050154 mailed Jul. 3, 2008.
(Continued)

*Primary Examiner* — Thomas G Black
*Assistant Examiner* — Peter D Nolan
(74) *Attorney, Agent, or Firm* — Lowe Hauptman & Ham LLP (57) ABSTRACT

An apparatus is disclosed for monitoring the load on at least one part of an aircraft landing gear during landing of the aircraft. The apparatus comprises a housing containing a sensor which senses a parameter indicative of the load in the part of the landing gear, a processor which receives signals from the sensor and processes the signals to produce data representative of the parameter measured by the sensor, a battery which provides electrical power to the processor, a memory for storing measurement data from the processor, and a wireless transmitter which is controlled by the processor. The wireless transmitter is arranged to transmit at least some of the measurement data from the processor to a remote device located outside of the housing.

10 Claims, 4 Drawing Sheets

(51) Int. Cl.
*G01L 5/00* (2006.01)
*G07C 5/00* (2006.01)
*G07C 5/08* (2006.01)

(56) References Cited

U.S. PATENT DOCUMENTS

| | | | | |
|---|---|---|---|---|
| 4,302,745 | A * | 11/1981 | Johnston et al. | 340/963 |
| 4,480,480 | A * | 11/1984 | Scott et al. | 73/769 |
| 5,047,942 | A * | 9/1991 | Middleton et al. | 701/15 |
| 5,421,204 | A * | 6/1995 | Svaty, Jr. | 73/786 |
| 5,499,025 | A * | 3/1996 | Middleton et al. | 340/959 |
| 5,511,430 | A * | 4/1996 | Delest et al. | 73/802 |
| 5,826,833 | A * | 10/1998 | Evans et al. | 244/183 |
| 6,181,990 | B1 * | 1/2001 | Grabowsky et al. | 701/14 |
| 6,289,289 | B1 * | 9/2001 | Zweifel | 702/34 |
| 6,354,152 | B1 * | 3/2002 | Herlik | 73/597 |
| 6,473,677 | B1 | 10/2002 | Hershey et al. | |
| 6,676,075 | B2 * | 1/2004 | Cowan et al. | 244/100 R |
| 6,909,985 | B2 * | 6/2005 | Stana | 702/141 |
| 7,164,366 | B2 * | 1/2007 | Delaplace et al. | 340/945 |
| 7,193,530 | B2 * | 3/2007 | Nance | 340/960 |
| 7,274,310 | B1 * | 9/2007 | Nance | 340/960 |
| 7,558,701 | B2 * | 7/2009 | Andarawis et al. | 702/183 |
| 7,589,645 | B2 * | 9/2009 | Schmidt | 340/960 |
| 2006/0106582 | A1 | 5/2006 | Schmidt | |
| 2006/0144997 | A1 * | 7/2006 | Schmidt et al. | 244/100 R |
| 2007/0006652 | A1 * | 1/2007 | Weldon et al. | 73/579 |
| 2007/0008187 | A1 | 1/2007 | Schmidt | |
| 2007/0072639 | A1 * | 3/2007 | Frost et al. | 455/550.1 |
| 2008/0033607 | A1 * | 2/2008 | Zeliff et al. | 701/29 |
| 2008/0114506 | A1 * | 5/2008 | Davis et al. | 701/16 |

FOREIGN PATENT DOCUMENTS

| | | |
|---|---|---|
| EP | 1653207 A2 | 5/2006 |
| WO | 03091682 A1 | 11/2003 |
| WO | 2006130984 A1 | 12/2006 |
| WO | 2007023280 A1 | 3/2007 |

OTHER PUBLICATIONS

UK Search Report for GB0704878.8 dated Jul. 10, 2007.

* cited by examiner

AIRCRAFT LANDING GEAR MONITORING APPARATUS

RELATED APPLICATIONS

The present application is based on International Application Number PCT/GB2008/050154 filed Mar. 5, 2008, and claims priority from British Application Number 0704878.8 filed Mar. 14, 2007, the disclosures of which are hereby incorporated by reference herein in their entirety.

This invention relates to improvements in monitoring apparatus for use in measuring the load applied to landing gear for aeroplanes during, in particular, heavy landings.

At present a robust monitoring apparatus for an aircraft landing gear is not known. Such apparatus would be useful in determining the load carried by the landing gear on landing as it is known that excessive mechanical loads can arise during hard landings. To ensure the safety of the aircraft the landing gear should not be subject to loads that exceed the load capacity of the gear. Such loads will cause strain in the landing gear parts and if this is too high damage can occur. As damage could lead to failure the landing gear must be repaired before another flight that is both time consuming and costly. It is notoriously difficult to assess the loading by eye.

We are aware of the teachings of EP1499864 in which a module for sensing strain in a landing gear component is described. The module includes a removable unit containing a rechargeable (or replaceable) battery and a memory that stores information gathered from the sensor. This unit is interrogated remotely from the airplane at a data processing centre. Removal of the unit allows the battery to be recharged after each hard landing if required.

According to a first aspect the invention provides an apparatus for monitoring a parameter indicative of the load applied to at least one part of an aircraft landing gear during landing of the aircraft, the apparatus comprising a housing containing a sensor which senses strain in the part of the landing gear, a processor which receives signals from the sensor and processes the signals to produce data representative of the parameter measured by the sensor, a battery which provides electrical power to the processor, a memory for storing measurement data from the processor, and a wireless transmitter which is controlled by the processor and which is arranged to transmit at least some of the measurement data from the processor to a remote device located outside of the housing.

The invention therefore provides for a robust, self contained, apparatus to be fitted to the landing gear of an aircraft which provides more accurate information about loads than a visual inspection could. Because a wireless transmitter is provided, no direct electrical connection is required.

The sensor may comprise a strain gauge which measures the strain in a part of the landing gear and which enables the loads to be determined provided knowledge of the material used in the component is known. Strain is therefore a direct indicator of the load in the component as is well known to the skilled person.

The apparatus may include a battery that may comprise a long life battery, by which we mean that it may store sufficient energy to power the processor, the memory, the sensor and the transmitter for a long time. By this we may mean at least 1 year, or perhaps more than 10 years or 20 years or more. This allows the apparatus to be fitted in place and left in service for many years without removal or dismantling.

To assist in reducing battery power consumption the applicant has appreciated that various additional features may be provided in at least some embodiments.

In one arrangement, the processor and sensor may be adapted to sense and store only the peak strains measured by the sensor. It may store only the peak strain during a landing. This ensures that the processor and sensor consume less power than they would if they were to measure strain continuously and to continuously write the measurements to a memory. By peak strains we only mean the maximum strain in a landing element, or all strains measures over a threshold valve. Indeed, it may not measure the external peak but simply give an output indicating that an "excessive" strain event has been measured. This could take the form of a flag being raised for example.

As alluded in the previous paragraph the apparatus may only measure on landing. Indeed the sensor and optionally at least part of the processor may be powered down when the aircraft is not landing.

To tell whether a landing event is initiated, the apparatus may include a landing event initiation sensor that provides a signal to the processor indicative of a landing event. It may indicate the start of a landing event such as the lowering of the landing gear from its stored position within the aircraft to its down position.

The landing event initiation sensor may comprise a tilt switch but it may comprise an accelerometer. Most preferably it will comprise a three-axis sensor that provides an output indicative of the orientation of the apparatus in three dimensions. This is most advantageous as it allows the device to be fitted to any landing gear in any orientation. The processor may sample the output of the sensor when the landing gear is in the stored position and also when in the down position and store these values in memory. This may be performed during set-up. Because a 3-axis sensor is used this procedure will always work, unlike a simple tilt switch that restricts the possible orientations of the apparatus in which it can be installed. A three axis sensor can be formed from three linear (single axis) accelerometers at right angles to one another, e.g. one in each of the X, Y and Z planes.

The output of the three-axis sensor is filtered to remove variations caused by the normal movement of the aircraft or vibration. The sensor is arranged so that it can be turned on and off by the processor to save power.

In a still further refinement, the apparatus may be adapted to store and/or transmit strain measurement data only if the measured peak strain is excessive. Thus, no data will be stored or sent if the landing gear was not subjected to a hard landing. To enable the device to determine that a strain peak does exceed a value that indicates it to be excessive, a threshold value may be stored in the memory. Any data from the processor may be compared with this threshold, and only transmitted if it exceeds it.

The processor may be adapted to measure the strain when the sensors are not loaded, i.e. prior to a landing, to provide a reference strain measurement. This may advantageously be used to check the operation of the strain sensor. The memory may store a calibration value that is representative of the output of the strain gauge that is expected when it is not loaded. If the measured strain differs from the calibration value an error flag may be raised and, optionally, the no-load measure strain stored in the memory for transmission.

The device may store data from more than one landing event in the memory. For example, data from 5 landings may be stored. Data may be stored for the most recent landings, or only for those that correspond to hard landings in which excessive strain is present.

This is advantageous as it allows trends in the loading of the landing gear to be observed which could indicate a potential problem arising.

The or each measurement stored in the memory may be stored with an associated time stamp indicative of the time that the measurement was made. By time we may mean real time or landing time, e.g. which landing the data came from. A real time clock may be provided. Outputting this time stamp enables a confidence valve to be derived indicative of which output measured data is associated with which landing event.

The apparatus may include an initiation means—that is, a once-off mechanism to switch the apparatus from a post-manufacture storage state ("shelf mode") to an initial set-up state prior to entering normal operation. This may comprise a switch such as a reed switch or solid-state magnetic sensor activated by an external magnet, or a Low-frequency detection coil activated by an external transmitter (as typically used for initiation in automotive tyre pressure monitoring systems). When is shelf mode, it may, for example, consume no power with even the real time clock switched off.

The sensor may comprise a strain gauge such as a resistive strain gauge. Preferably it has a high resistance by which we mean greater than 1000 Ohms. This ensures that the current drawn by the sensor from the battery is kept low so as to increase battery life.

The output of the sensor may be measured using a sample and hold circuit which may normally be off, but may be initiated by the processor at the time that measurements are required. The processor may turn the sample/hold circuit off once measurements are no longer needed. The sample and hold circuit may capture the peak strain during the measurement period.

A switch may be provided which the processor controls and which can be operated to start and stop measurements.

The output of the sample and hold circuit may be filtered to remove noise that may be present.

The sensor measurement may therefore produce an analogue output signal representative of strain. An analogue to digital (A/D) converter may be provided to convert the signal to digital data for processing by the processor and subsequently writing to the memory if required.

The sensor may be bonded directly to the part of the landing gear in which strain is to be measured. Alternatively it may be bonded to an intermediate component, which is in turn secured to the component to be measured. For example, it may be bonded to an inner part of the housing of the apparatus that is in turn bonded or riveted to the component.

A temperature sensor may also be provided. The output of this sensor will indicate the temperature and may be used by the processor to compensate for the effects of temperature variation on the measurement made by the strain sensor. This may also be captured using a sample and hold circuit which may be switched on and off by a switch. This may be a different switch to that used to turn the strain sensor on and off as temperature measurements may be made over a shorter time period than the strain measurements to reduce power.

The wireless transmitter may comprise an RF transmitter such as an RFID device. It could alternatively be an optical device that emits an optical (visible or infrared signal). This will comprise a drive circuit that converts data from the memory into a radio frequency signal suitable for transmission and an RF antenna. The wireless transmitter may only be powered up at times when the signal is to be transmitted to reduce power consumption. For example, it may be powered up after a defined time delay following a landing event and for a defined time. These defined delay and times may be stored in the memory. For example, a delay of 5 minutes and a time of 30 minutes may be used, allowing for the time that the plane will take to get to its landing position after hitting the runway.

Alternatively, the transmitter may power up following receipt of a wake signal or other "transmit now" request transmitted from the remote receiver device. It may await such a signal (or other external prompt) and responding by transmitting the measurement data. In an exemplar arrangement, a button on the measurement device could be pressed manually by a ground crew member to start the transmission, or a switch operated.

The apparatus may include an ID tag stored in the memory that identifies the device to the remote receiver. This enables multiple devices, each with a different ID, to send data to one receiver without conflict.

The device may transmit the ID together with the measured data.

The housing of the device may be hermetically sealed to prevent the ingress of rain or ice or condensation into the housing. Because nothing is removable a very robust sealing can be achieved. All of the components of the apparatus may be contained within a single sealed housing.

According to a second aspect the invention provides a system comprising multiple apparatus according to claim 1, each apparatus having stored in its memory a different ID tag.

According to a third aspect the invention provides in combination apparatus according to the first aspect of the invention and a remote receiving device that includes a wireless receiver compatible with the signals transmitted by the wireless transmitters.

The skilled person should also understand from reading this document that separate protection for any of the dependent features may be sought by way of an independent claim. For example, protection for an apparatus for measuring the load in a component which includes a 3 axis sensor to determine its position and determine whether it is in an operative position or an inoperative position may be obtained without limitation to the use of an wireless transmitter. A removable memory, or direct hardwired link to the data in the memory could be provided. Similarly independent protection for the feature of the power saving modes to enhance battery life between recharges and the initiation switch may be sought that is used to minimise battery drain prior to installation may be sought, again with the omission of the wireless transmitter. Similarly, independent protection for the feature of attaching a strain gauge to the component indirectly through either the housing or an additional component may be sought. Of course, these examples are not intended to be limiting.

There will now be described, by way of example only, one embodiment of the present invention with reference to and as illustrated in the accompanying drawings of which.

Figure 1:
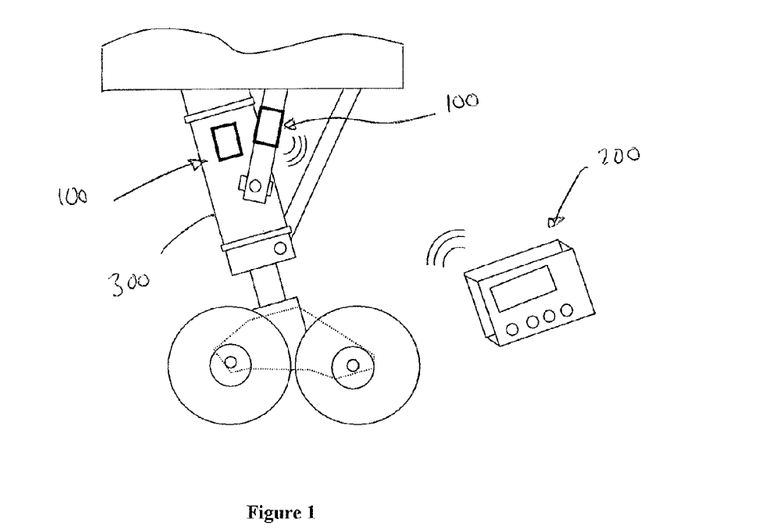
FIG. 1 is an overview of an apparatus according to an aspect of the invention fitted to a landing gear of an aircraft.

The apparatus comprises two main functional devices. The first (of which more than one can be provided) is the measurement and transmitter device 100 that is fitted to a part of the landing gear of an aircraft. Two such devices are shown in FIG. 1 of the accompanying drawings to enable the strain in two different parts of the landing gear 300. The second is a remote receiver in the form of a portable hand held data collection terminal 200 and analysis terminal which includes a receiver for receiving data transmitted from the devices 100.

It is intended that the measurement and transmitter devices 100 will be fitted to key components of the landing gear (such as the Lower Articulation Link) which are known to be good indicators of overload stresses. Each device 100 comprises a self-contained unit and will monitor strain in a single component with no connection to any other aircraft system. As will become apparent, each device 100 is normally inactive apart from a continuously running real-time clock (RTC) (not shown). As the gear 300 is deployed for landing, a "gear deployment sensor" will activate and the sensing module will prepare for landing. After a nominal delay of around 1.5 minutes to allow for the approach to the runway, the device 100 will begin logging the strain level in its monitored component. During landing, the peak value of the strain (compressive or tensile) along with the time from the RTC will be stored. Once the strain has reached a certain threshold (perhaps equal to the static load of the aircraft on its landing gear), the device 100 will know that landing has occurred, and will switch itself off after a given time delay to conserve battery power. If landing does not occur within a certain time after gear deployment (e.g. if the landing is aborted), the device will also switch off.

Each device 100 will retain the data from the last 5 landings. If a hard landing has not been detected, there will be no further action. If a hard landing has been reported by the pilot, the handheld reader 200 will enable ground staff to download the peak strain and time data from the last 5 landings from each device on the aircraft. Each device 100 has its own unique electronic serial number or ID to avoid confusion between individual devices.

Once the peak data has been downloaded, maintenance staff can then make the decision whether the aircraft is fit to continue in service or if repairs are required. The device 100 also stores the magnitude and the date/time of the highest-ever strain detected and can download this also on demand.

When the aircraft next takes off, the gear deployment sensor will detect the stowage of the gear, so the module will return to the flight mode The main purpose of the system is therefore to record peak strains in selected landing gear structural components and allow the aircraft operators to download this data in order to provide better information regarding landing gear integrity following an overload event. The information will be used to help make decisions about the need for landing gear repair or replacement.

The Portable Terminal 200 includes a keypad 210 or touch screen and display and provides the following functionality:
- allow data to be downloaded from the Sensing Module(s) on a particular aircraft
- allow calibration data to be uploaded to the Sensing Module(s)
- allow the correct time to be uploaded to the Sensing Module(s) so that the real time clock can be re-set if necessary.
- display the data in a suitable manner for the end user.
- Perform data validity checking and display diagnostic data from the sensing modules(s)

Figure 2:
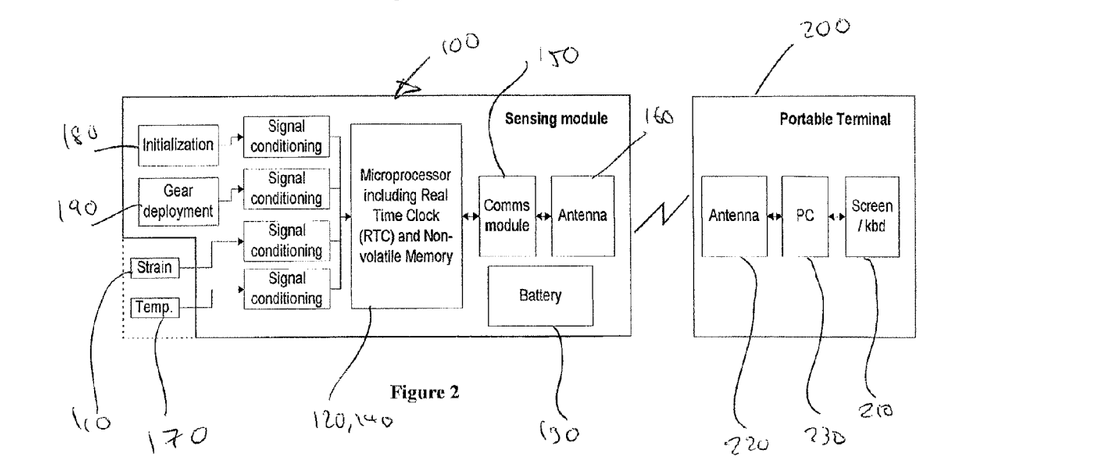
FIG. 2 is a schematic of the circuitry of the measurement device and remote receiver of the apparatus of FIG. 1.

The portable terminal 200 may also:
- Store and display on demand sets of readings from different aircraft
- Interface with ground based maintenance database systems to transfer overload data
- Contain algorithms to give a go/no-go indication after a hard landing incident based on the recorded data The top-level system design is described in FIG. 2 which outlines the main system components. At the top-most level the system consists of a sensing module which is permanently attached to the landing-gear component being monitored and a portable terminal which is used to download data from the sensing module.

The measurement and transmitter devices 100 each comprise a self-contained sealed housing containing a strain sensor 110 which senses strain in the part of the landing gear, a processor 110 which receives signals from the sensor 110 and processes the signals to produce data representative of the strain measured by the sensor, a battery 130 which provides electrical power to the processor 120, a memory 140 for storing the data from the processor, and a wireless transmitter (communications module 150 and antenna 160) which is controlled by the processor 120 and which is arranged to transmit at least some of the data from the processor 120 to a remote device 200 located outside of the housing.

The portable terminal 200 comprises a receiver antenna 220 compatible with the transmitter of devices 100, a keypad or touch screen 210 and a signal processor 230.

Battery: Power shall preferably be provided from a Lithium Thionyl Chloride chemistry battery. Other energy sources may of course be used including energy harvesting from the environment.

Strain sensor: Strain is measured by means of, for example, a bonded foil strain gauge 110. High resistance (preferably 1000 ohm) strain gauges are used to minimise the current drawn. A one-off zero-offset adjustment is be made in the electronics after assembly and bonding of the strain gauge. Any other type of strain sensor could also be used. The strain is measured after the landing gear has been deployed, but before the landing occurs. This information is used to detect faults such as electronic problems, gauge creep or long-term drift:

a) From one landing to the next, the unloaded strain as measured by the device should change very little. Any significant change between landings would indicate a problem with the strain gauge or the module.

b) The unloaded strain should always be below a threshold. If the value moves above this, it could indicate a long-term creep or drift problem with the strain gauge or the electronics.

In addition the strain is measured during landing and the peak measured value is stored.

Memory: A non-volatile electronic memory 140 is provided which stores program code for execution by the processor 120. An area of random access memory is also provided into which data from the processor 120 representing strain measurements can be stored.

Temperature sensor: Optionally, to allow for temperature compensation, a temperature sensor 170 is placed in close proximity to the strain sensor 110. The strain gauge circuit and temperature measurement circuits are arranged so that they can be turned on and off by the processor to save power.

Processor: The processor 120 of the measuring devices 100 in this example comprises a microprocessor device from the Texas Instruments MSP430 family. The microprocessor is chosen for the appropriate I/O capability and low power consumption. The processor executes program code (not shown) which is stored in the memory.

The program instructions cause the processor 120 to operate as follows. Upon installation of the strain gauge, the offset at zero strain is measured and then subtracted from subsequent readings. After the gear is deployed, and before landing, the "unloaded" strain is measured and stored. During landing, the peak tensile and/or compressive strain is measured and stored, along with a time stamp, in the memory. The time stamp is used to correlate the data with reported hard landing incidents and also with data from other sensors on the aircraft. If signals from multiple sensing modules on the landing gear are compared, the confidence of the measurement will be increased. A confidence value may be determined by the receiver terminal.

Optionally, the temperature sensor 170 can be also read and its output used to compensate the strain reading for ambient temperature variations according to the data provided by the strain gauge manufacturer.

The data from the last landing plus the previous four are stored ready for download if required. As each new landing occurs, data from the oldest landing stored is discarded. Obviously, data for a different number of landings could be stored if required.

Wireless transmitter: An example of a commercially available, standardised protocol which could be used for communication between the measuring device 100 and Portable Terminal 200 is ZigBee. Any other suitable standardised or proprietary wireless protocol may be used, including Radio Frequency Identification (RFID). Using RFID would require a slightly different form of operation, with a probe attached to the portable terminal which would be brought manually within close proximity of each sensing module to transfer the data. This would have the advantages of easy visual identification of individual devices 100, and reduction of RF emissions which would improve the EMC performance.

Initiation means: The devices 100 also includes a means of initiation—that is, a once-off mechanism 180 to switch the sensing module from a post-manufacture storage state ("shelf mode") to an initial set-up state prior to entering normal operation. The purpose for this is to allow the sensing module to be in a state of minimal power usage prior to it being installed on an aircraft in order to preserve battery life.

The initiation could be implemented using the RF link but this could be done via other means, such as a reed switch or solid-state magnetic sensor activated by an external magnet, or a Low-frequency detection coil activated by an external transmitter (as in automotive tyre pressure monitoring system)

Gear deployment sensor: The device 100 additionally includes a Landing Gear Deployment sensor 190 to "wake-up" the sensing module prior to coming into land.

In this example the landing gear deployment sensor comprises a three-axis accelerometer so that the switching orientation and threshold can be freely programmable depending on the sensing module mounting orientation and the component being monitored. This would enable a single type of electronics module to be configured in software to be mounted onto a variety of landing gear components.

Single or dual axis accelerometer configurations would also be possible if the module follows a simple path during gear deployment.

The output of the accelerometer is filtered to remove variations caused by the normal movement of the aircraft or vibration. The accelerometer is arranged so that it can be turned on and off by the microcontroller to save power.

Figure 5:
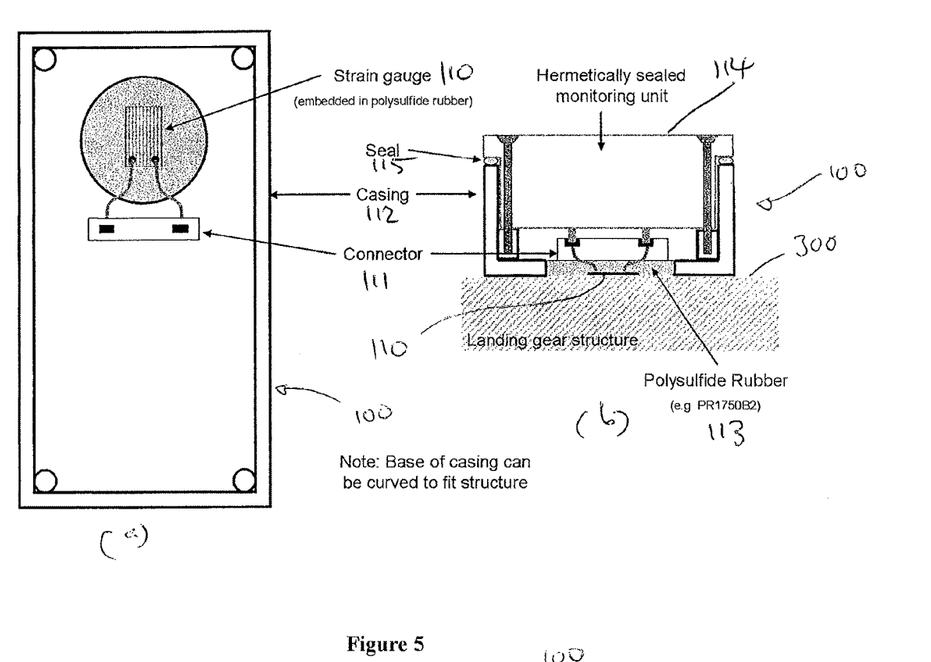
FIG. 5 illustrates a first arrangement of the strain gauge of the device of FIG. 1.

The housing and assembly detail: Two packaging concepts are disclosed here. In a first arrangement it is proposed to bond the strain sensing element directly to the landing gear structure (FIG. 5). In an alternative shown in FIG. 6 it is proposed to integrate the strain sensing element into the module.

FIG. 5 illustrates how the sensing element 110 could be bonded to the landing gear structure, with the electronic monitoring module added to this separately. A high strength adhesive is used to hold the stain gauge in place such that strain in the component causing it to elongate or contract will cause corresponding elongation or contraction of the gauge. Wires from the gauge are terminated in a connector block 111, and a protective frame 112 or casing is then fixed around the gauge using bolts or rivets. A polysulphide resin 113 is then poured over the gauge to seal it to the frame 112 leaving the connector exposed. Finally a secondary housing 114 containing the remaining components is secured to the frame with an elastomer seal 115. The connector is then connected to the circuitry within the secondary housing. The whole sealed frame and secondary housing then define the housing of the device 100. The key advantages of this approach are direct measurement of landing gear stress and that the strain gauge bonding process is well characterized and understood.

Figure 6:
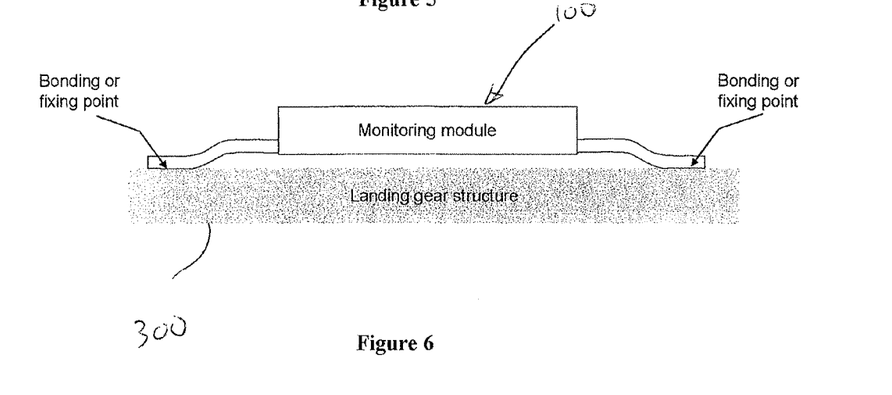
FIG. 6 is an illustration of a second arrangement for the strain gauge.

FIG. 6 illustrates conceptually the situation with the strain sensing element 110 integrated into the monitoring device 100. In this case, the device itself is fixed to the component in such a way that elongation or compression of the component 300 causes a corresponding elongation or compression of the unit 100. The gauge 110 senses the strain in the unit 100 and thus the strain in the component indirectly. An advantage of this approach is that the unit may be easier to install and may be more robustly handled. Special care is needed in securing the unit to the component.

Signal conditioning: Each of the sensing means will require signal conditioning, the exact nature of which will depend on the sensor type used. Power consumption must be minimised whilst maintaining the required functionality.

Calibration: During manufacture of the sensing module the electronics will be calibrated using known voltage/resistance inputs. It is envisaged that when the sensing module is connected to the strain gauge and assembled onto the aircraft landing gear structure which it will be monitoring, a zero-offset adjustment will be made. As the strain gauges and mounting process to be used are well understood and characterised, no further gain calibration will be needed.

Strain Gauge & Temperature Sensor Power Management Strategy

Powering the strain gauge 110 and temperature sensor 170 is a significant energy usage from the battery 130. The device 100 therefore operates a strategy for reducing the battery usage to increase its life. To reduce this as much as possible, the Strain gauges and temperature sensor are only powered when required.

Figure 3:
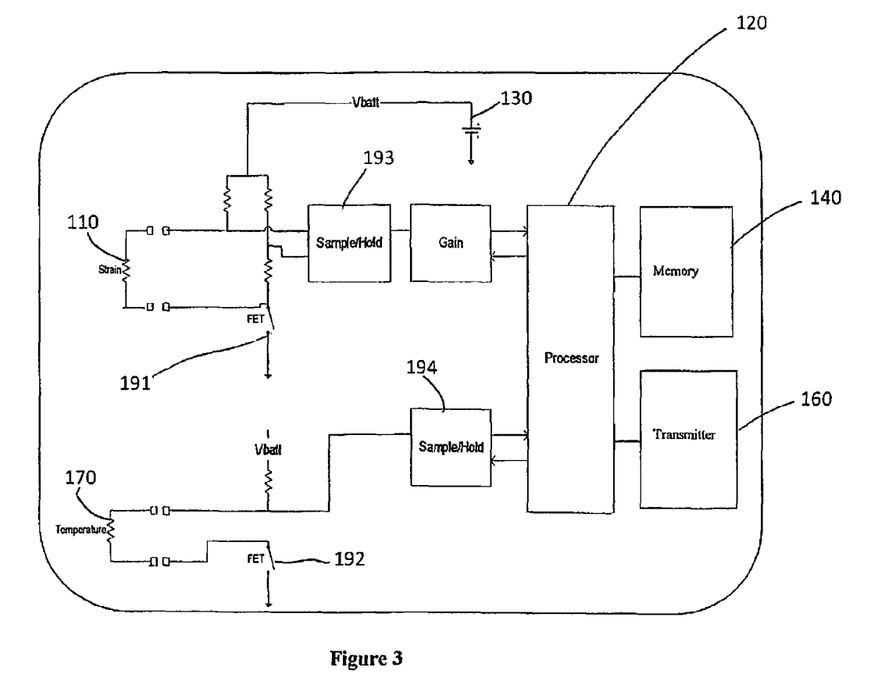
FIG. 3 is a more detailed schematic representation of part of the circuitry shown in FIG. 2.

A schematic diagram of the preferred circuitry is shown in FIG. 3 of the accompanying drawings. The strain gauge 110 and temperature sensor 170 are both high-current sensors and therefore require a strategy to minimise the dynamic power consumption. To help minimise the power consumed they are triggered by a respective switch 191, 192 which operates a respective sample and hold circuit 193, 194.

Figure 4:
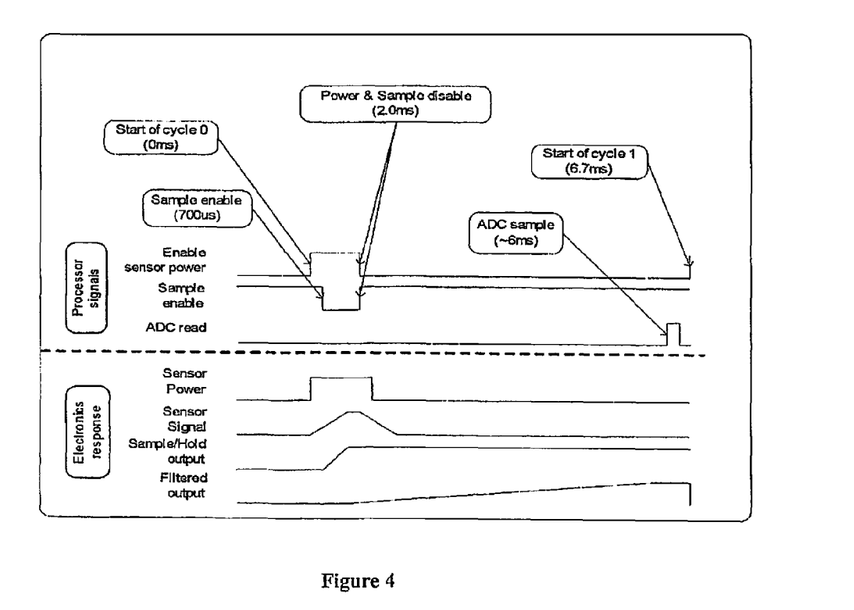
FIG. 4 is an illustration of the signals at the processor during capture of strain data before, during and after a landing event.

The low power consumption is therefore achieved by:
1. Enabling power to the sensor by closing the switch
2. Setting the sample/hold circuit to sample the signal
3. Wait a period
4. Setting the sample/hold circuit to hold the peak signal
5. Removing power from the sensor by opening the switch
6. Waiting for the filter to settle
7. Read the value held by the sample/hold with ADC The timing of the start and end of sampling is also important to minimise energy usage, as the strain gauges, signal conditioning electronics and ADC system can be powered down when sampling of the strain and temperature is not required. One possible timing strategy that can be used is illustrated in FIG. 4 of the accompanying drawings. Note that the timings shown are approximate.

A time delay after gear deployment before sampling starts may be used. This avoids wasting power while the aircraft is approaching the runway. The time delay will be around 1.5 minutes. Additionally, the sampling may be terminated by landing detected or timeout.

Once a landing has been detected (by the strain exceeding a pre-determined threshold) the sampling may be stopped after a short delay (approx 2 seconds). This will ensure that the peak strain is captured. If a landing is not detected within a longer time (for example, 5 minutes) the sampling will also stop as the landing has probably been aborted.

The RF Module Power Management System

As the RF communication from the wireless transmitter is also a significant user of energy, the RF module is only powered when communication is expected. This will only happen in the ground idle mode. The receiver will be activated periodically (e.g. every 2 seconds) in this mode to detect commands from the portable terminal 200. Once the commands have been actioned and the data transferred the RF module returns to the periodically polled mode. Once the sensing module leaves the ground idle mode, the RF module is disabled. This has the further advantage of improving EMC by ensuring that there are no RF emissions from the module in flight, and, as the module receiver is disabled, it will be less susceptible to external RF interference causing spurious operation.

After the module has been assembled and calibrated, it goes into a shelf mode where all peripherals are shut down for storage. An initialisation process is then used to prepare the module for service once it is installed onto the aircraft.

RF transmissions are minimised by only transmitting data on demand from the portable terminal. This would normally only be carried after a hard landing incident had been reported or during scheduled maintenance.

When the power is first connected (power on mode), the unit will be calibrated and have a unique serial number stored within it (calibrate/set-up mode). This may, for example be carried out via a special function of the portable terminal. After storage in shelf mode, the instrumented component with the landing gear module is fitted to the aircraft and initialised. Once installed on the aircraft, the landing gear module will enter the ground idle mode, during which time it keeps the real-time clock updated and waits for a gear-stowed event to be detected, or for communication to be requested by the portable terminal.

Once gear stowage has been detected, the module enters the air idle mode. In this mode, the RTC runs while communications is disabled. The gear deployment sensor is polled periodically to check for deployment.

In the event of the landing gear being deployed, the module enters the Measure and Log mode. In this mode, there is first a time delay to allow for the approach to the runway, then the strain gauge and optional temperature sensor are read at a rate sufficient to capture transient events. The module then logs the peak compressive and/or tensile strain measured during this landing event. Once an actual landing has been detected (by the strain exceeding a threshold), the system will move to ground idle mode (after a short delay to make sure the peak strain is captured). Alternatively, if a landing is not detected within a certain period (timeout), the system will also move to ground idle mode.

In ground idle mode, the RF communication system is polled periodically to check for commands from the portable terminal. If the ground module requests communication, the landing gear module will transmit the data stored for the previous landings to the ground module for display to the user. Once the communication has finished, the landing-gear module will return to ground idle mode.

In ground idle mode the gear deployment sensor is also polled periodically to check for gear stowage after take-off. The module remains in ground idle mode until the gear deployment sensor detects the gear stowage. The module then moves back to air idle mode.

Further Explanation of Device Operating Modes

Figure 7:
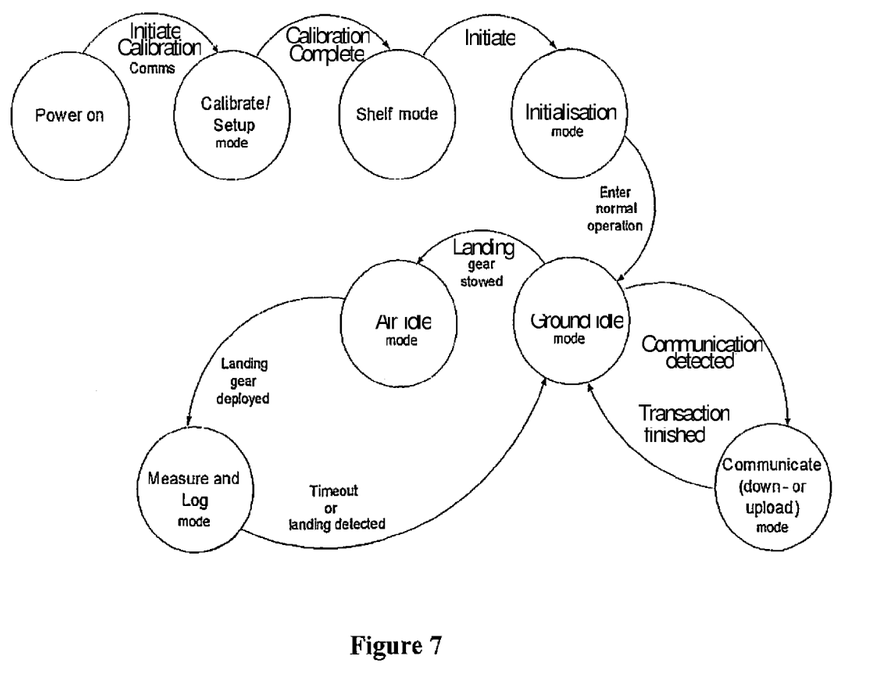
FIG. 7 is a state diagram showing the different modes of operation of the apparatus and the transitions between the different modes that are possible.

The main operating modes and transitions between the modes that are possible are shown in FIG. 7 of the accompanying drawings. Some or all of the modes may be optional although for the purposes of the example illustrated all modes are available. The functionality of each of the modes can be summarised as follows.

Power on mode: This is the state when power is applied to the circuit for the first time after manufacture. Pins, peripherals, clocks and timers of the microprocessor are configured. Once completed, the "Calibrate/Setup" mode is entered.

Calibrate/setup mode: Any necessary calibration of the electronics is performed here using a known voltage input or resistance. Once complete, the zero-offset of the strain gauge is read and the unit moves into "Shelf mode".

Shelf mode: The unit remains in its lowest power mode to preserve settings, but is not active. The Real-Time Clock (RTC) is off and the RF module is not powered. After installation, the unit is subjected to an initiation procedure and moves into "Initialisation mode"

Initialisation mode: The unit is moved into this mode when entering active service. The RTC is started and set via the RF link and the unit then moves into "Ground Idle" mode.

Ground Idle mode: The unit waits in this mode when the aircraft is on the ground. At set periods, the trigger and wireless communication links are checked for activity. If the trigger indicates that the landing gear has been stowed, then the unit moves into the "Air idle" mode. If a communication request is indicated by the wireless communication module, then the unit moves into the "Communicate—download" or "Communicate—upload" mode. (Note that these are distinct modes but, for clarity, only one mode is shown on the state transition diagram.) Communication can only be initiated from the "Ground Idle" mode when in active service. The RTC runs in this mode.

Air Idle mode: Once the trigger mechanism indicates that the landing gear has been stowed, the unit moves into this mode. The RTC runs and the trigger is polled at set intervals to look for deployment of the landing gear. Once deployment has been detected, the unit waits a further preset time (during the final approach to the runway) before moving into the "Measure and Log" mode. The RTC runs in this mode. Communications are disabled in this mode.

Measure and Log mode: The strain gauge and associated interface circuitry are powered up at this point. ADC sampling commences, and the highest and lowest value seen are captured along with the date and time of the peak. Once data values corresponding to a landing have been measured, the sampling will stop. If no such values are seen, sampling will stop after a preset time (i.e. no landing has occurred) to save power. The newly captured highest and lowest values are compared with the all-time highest and lowest values, and these are replaced if they are exceeded. The RTC runs in this mode. Once these tasks are complete, the device returns to the "Ground Idle" mode. The temperature sensor 170 is also powered and read in this mode. Communications are disabled in this mode.

Communicate—download and Communicate—upload modes: Wireless communications are established when in this mode. When downloading data, the requested data type is first transmitted by the Portable Terminal 200 to indicate the type of data request. The requested data packets are then returned. When uploading data, the received packet is transmitted back to the Portable Terminal to confirm correct receipt. The RTC runs in this mode, and can be set as an upload function. "Download" refers to data transfer from the device 100 to the Portable Terminal 200. "Upload" refers to data transfer from the Portable Terminal 200 to the device 100.

The invention claimed is:

1. A method for monitoring the load on at least one part of an aircraft landing gear during landing of the aircraft, said method comprising the steps of:
   monitoring output from a landing gear deployment sensor for a first indication indicating that the landing gear of the aircraft has been deployed;
   obtaining strain measurements from one or more parts of said landing gear in response to said first indication until one or more of said strain measurements exceeds a first predetermined strain threshold indicating a landing event having occurred;
   storing data representing the peak strain measurement if said peak strain measurement exceeds a second predetermined strain threshold indicating that said landing event represented a hard landing;
   enabling a wireless transmitter in response to said storing of said peak strain measurement data for transmitting said peak strain measurement data from said aircraft to an external device, wherein powering up of a measurement device is delayed for a first predetermined period after said first indication from said landing gear deployment sensor, and wherein said predetermined period is set so as to conserve power before said landing; and,
   determining whether a landing has occurred when the strain has exceeded the first pre-determined threshold; based on said determining, wherein said transmitter is disabled after a second predetermined period after said landing event, and stopping said sampling after a first delay if said landing has occurred, or said transmitter is disabled in response to a detection of a second indication from said landing gear deployment sensor indicating that said landing gear has been stowed, and stopping said sampling after a second delay if said landing has not occurred, wherein said second delay is longer than said first delay.

2. A method according to claim 1 in which said peak strain measurement data is transmitted in response to a request signal from said external device.

3. A method according to claim 1 in which peak strain measurement data representing a predetermined set of hard landings is stored.

4. A method according to claim 1 in which said peak strain measurement data is associated with a corresponding time stamp.

5. A method according to claim 1 in which said peak strain measurement data is provided in the form of an indication that said output of said strain measurement device has exceeded said second predetermined strain threshold.

6. An apparatus for monitoring the load on at least one part of an aircraft landing gear during landing of the aircraft, said apparatus being operable to:
   monitor output from a landing gear deployment sensor for a first indication indicating that the landing gear of the aircraft has been deployed;
   obtain strain measurements from one or more parts of said landing gear in response to said first indication until one or more of said strain measurements exceeds a first predetermined strain threshold indicating a landing event having occurred;
   store data representing the peak strain measurement if said peak strain measurement exceeds a second predetermined strain threshold indicating that said landing event represented a hard landing;
   enable a wireless transmitter in response to said storing of said peak strain measurement data for transmitting said peak strain measurement data from said aircraft to an external device, wherein powering up of a strain measurement device is delayed for a first predetermined period after said first indication from said landing gear deployment sensor, and wherein said predetermined period is set so as to conserve power before said landing; and,
   determining whether a landing has occurred when the strain has exceeded the first pre-determined threshold; based on said determining, said transmission means is disabled after a second predetermined period after said landing event, and stopping said sampling after a first delay if said landing has occurred, or said transmission means is disabled in response to a detection of a second indication from said landing gear deployment sensor indicating that said landing gear has been stowed and stopping said sampling after a second delay if said landing has not occurred, wherein said second delay is longer than said first delay.

7. An apparatus according to claim 6 in which said peak strain measurement data is transmitted in response to a request signal from said external device.

8. An apparatus according to claim 6 in which peak strain measurement data representing a predetermined set of hard landings is stored.

9. An apparatus according to claim 6 in which said peak strain measurement data is associated with a corresponding time stamp.

10. An apparatus according to claim 6 in which said peak strain measurement data is provided in the form of an indication that said output of said strain measurement device has exceeded said second predetermined strain threshold.

* * * * *